United States Patent [19]

Donaldson et al.

[11] Patent Number: 4,467,818
[45] Date of Patent: Aug. 28, 1984

[54] LOW PROFILE AXIAL FLOW COMBINE

[75] Inventors: Edward Donaldson; Kenneth A. A. Frisk, both of Brantford, Canada

[73] Assignee: 103100 Canada Inc., Brantford, Canada

[21] Appl. No.: 2,296

[22] Filed: Jan. 10, 1979

[30] Foreign Application Priority Data

Oct. 31, 1978 [CA] Canada ................................. 315533

[51] Int. Cl.³ ...................... A01F 12/60; A01F 12/44
[52] U.S. Cl. .................................... 130/27 T; 56/14.6
[58] Field of Search ............ 56/14.6; 130/27 R, 27 H, 130/27 T

[56] References Cited

U.S. PATENT DOCUMENTS

| 1,744,334 | 1/1930 | Schlayer | 130/27 T |
| 3,543,487 | 12/1970 | Bodine | 56/14.6 |
| 3,593,719 | 7/1971 | Ashton et al. | 130/27 R |
| 3,638,659 | 2/1972 | Dahlquist et al. | 130/27 R |
| 3,807,413 | 4/1974 | Jacobs et al. | 130/27 T |
| 3,857,400 | 12/1974 | De Coene | 130/27 T |
| 3,982,549 | 9/1976 | De Pauw et al. | 56/14.6 |
| 4,003,384 | 1/1977 | Komancheck et al. | 56/14.6 |
| 4,060,960 | 12/1977 | Hengen et al. | 130/27 R |

Primary Examiner—Paul J. Hirsch
Attorney, Agent, or Firm—Lockwood, Dewey, Alex & Cummings

[57] ABSTRACT

A low profile axial flow combine with a low center of gravity for improved stability, with reduced overall machine height for ease of shipping and with high capacity grain tank of the saddle type. A threshing and separating rotor, in coaxial relationship to a rotor casing, extends longitudinally and approximately horizontally in the combine to the discharge end for low rotor discharge of the threshed materials. Cleaning apparatus including the grain pan, the separator pan, the chaffer, the sieve screen and the blower are compactly nested beneath the rotor casing. A high capacity saddle grain tank extends over and down opposite sides of the rotor casing. A discharge auger extends transversely through the boots of the grain tank and through an auger housing interconnecting the boots. The upper end of the grain pan extends over the auger housing interconnecting the grain tank boots. The lower end of the grain pan is stepped.

1 Claim, 3 Drawing Figures

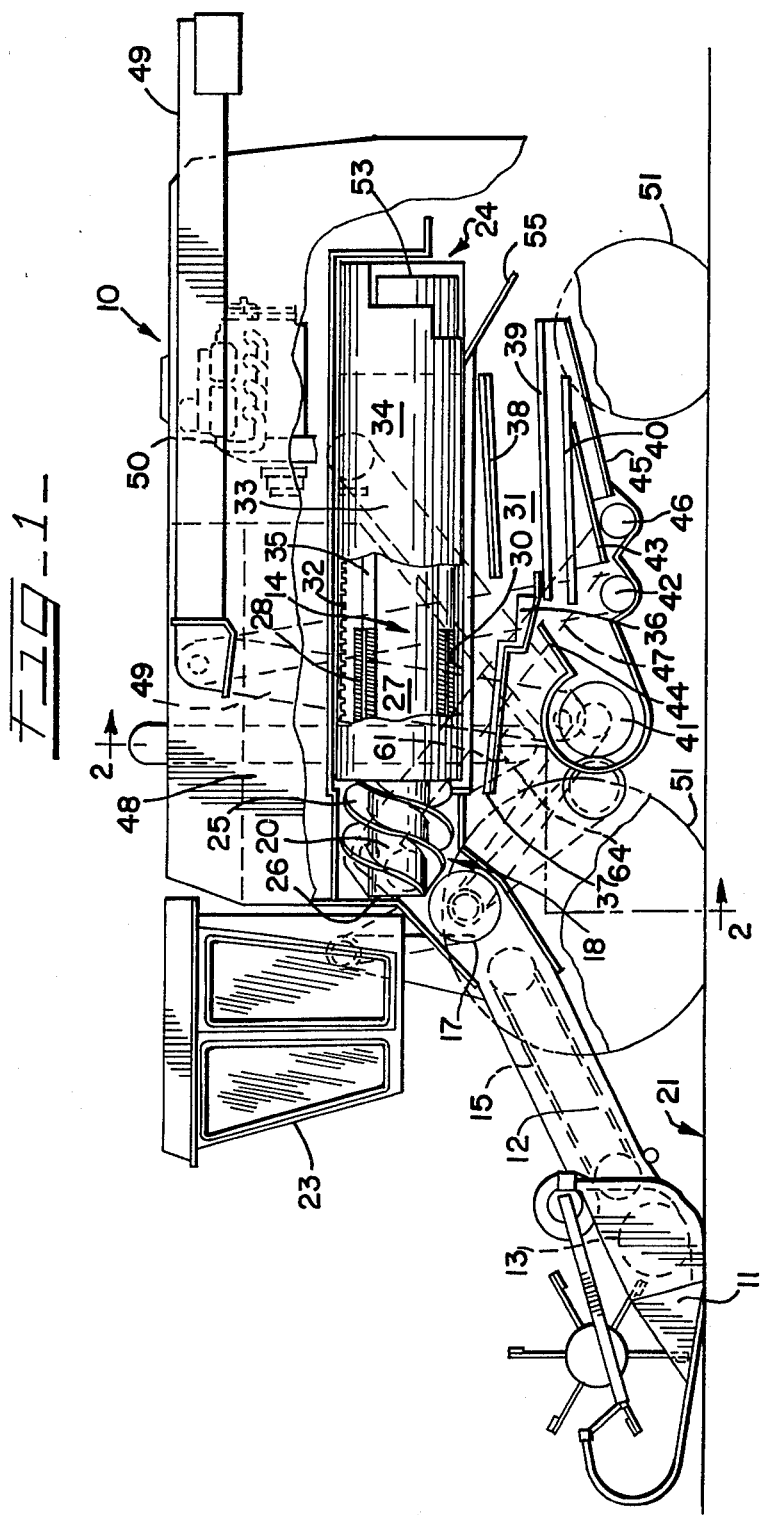

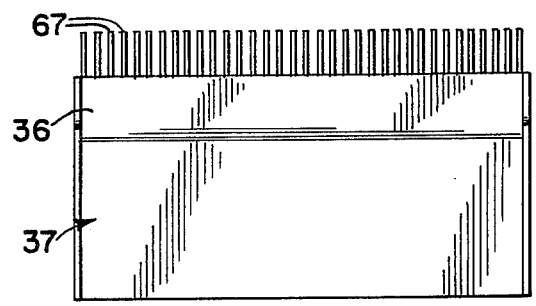
Fig_3_
Fig_2_
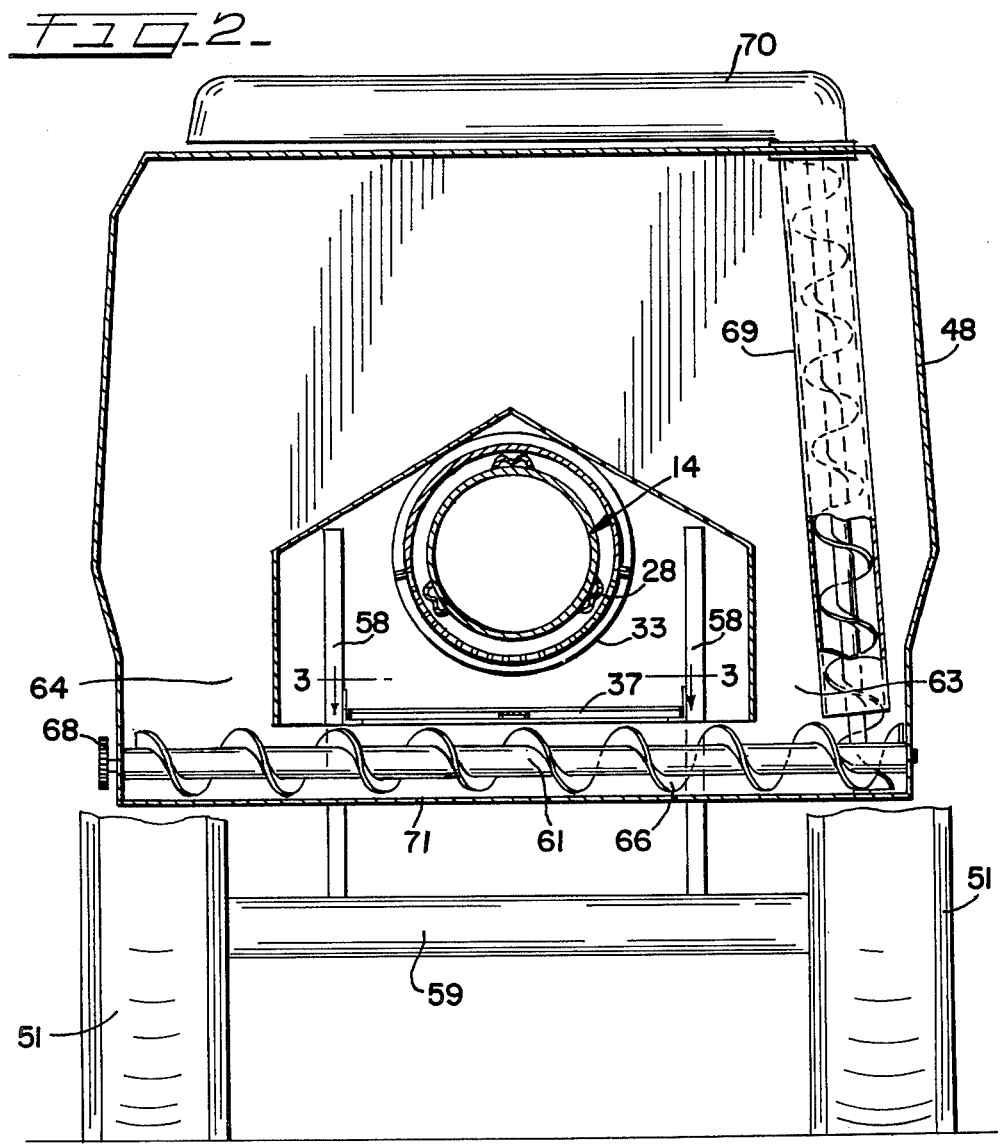

LOW PROFILE AXIAL FLOW COMBINE

This invention relates generally to improvements in low profile axial flow combines and is more particularly concerned with the internal arrangement of the axial flow combine components, permitting use of a high capacity saddle type grain tank with the rotor and rotor casing disposed in an approximately horizontal orientation for low rotor discharge of the threshed materials, and providing a low center of gravity for greater stability and reduced overall combine height to facilitate shipping.

A number of different types of axial flow combines for harvesting various types of agricultural crops have been proposed and are known to the prior art. In many of the prior art axial flow combines, the rotor is relatively short and terminates in the combine well short of the discharge area of the combine. The rotor is often inclined at an upward angle from the inlet end to the discharge end to provide sufficient room below the rotor and rotor casing for the cleaning area or for other purposes. Such upward inclination of the rotor and rotor casing is undesirable since the height of the combine must necessarily be increased, or sacrifices must be made to the capacity of the grain tank because of the space occupied by the rotor and rotor casing. Reduced capacity of the grain tank of the combine requires more frequent emptying during operation.

Some prior art combines have attempted to locate the cleaning area above the rotor casing in order to provide a lower orientation of the rotor and rotor casing. Such an arrangement has serious drawbacks since additional elevators or augers must be provided to move both the grain and the mixed grain materials to the appropriate areas of the cleaner for chaffing and sieving.

The object of the invention, generally stated, is to provide an axial flow combine possessing a low center of gravity for greater stability and reduced overall combine height for ease of shipping while incorporating a large capacity grain tank of the saddle type.

Another principal object of the present invention is to provide such a combine in which both the rotor and rotor casing extend longitudinally through the combine in a generally horizontal orientation for low discharge of threshed materials from the rotor.

A further object is to provide a plurality of pans in the grain cleaner area, including a grain pan, a separator pan, a chaffer and a sieve pan, in stepped or cascading relationship in a minimum amount of height below the rotor casing while still allowing sufficient space between the various pans for flow of large volumes of air thereabout and therethrough for removing chaff and the like.

Another object of the present invention is to provide such a stepped or cascaded pan arrangment in the grain cleaning area which serves to break up the grain and allow the grain to pass onto the chaffer and sieving portions of the cleaner in dispersed state for greater cleaning efficiency.

A further object of the invention is to dispose the upper end of the grain pan above cross auger housing extending between the boots of a saddle grain tank which extends over the rotor housing and downwardly on opposite sides thereof.

These objects and advantages of the invention, and others, including those inherent in the invention, are accomplished by an axial flow combine having a large capacity saddle grain tank and a rotor and rotor casing extending generally horizontally through the combine with a cascading cleaning area disposed immediately below the rotor casing. The cleaning area includes a grain pan, a separator pan, a chaffer and a sieve in a nested compact cascading relationship without interferring with the free flow of large volumes of air from a blower.

Due to the low compact configuration of the rotor, rotor casing and grain cleaning area, the axial flow combine has a low center of gravity and an overall height while incorporating a large capacity saddle grain tank.

The features of the present invention, which are believed to be novel and patentable, are also set forth with particularity in the appended claims. The invention, together with the further advantages thereof, can be readily understood by reference to the following description taken in conjunction with the accompanying drawings in which like reference numerals identify like elements, and in which:

FIG. 1 is a partly broken away side elevational view of an axial flow combine embodying the present invention;

FIG. 2 is a vertical sectional view on enlarged scale taken on line 2—2 of FIG. 1 with certain parts omitted or broken away; and FIG. 3 is a fragmentary plan view taken on line 3—3 of FIG. 1 showing the rear portion of the grain pan.

Referring to FIG. 1, there is shown a crop harvesting combine, generally designated 10, of the axial flow type. A front header portion 11 of known type rides along the ground to sever crops close to the ground. Different headers may be provided for different types of crops, such as corn headers, pickup headers or straight cut headers. A feeder 12 conveys crop materials to be threshed and separated from a header auger 13 to an axial flow rotor 14. Elevating and conveying means 15 disposed in the feeder 12 conveys crop materials from the header 11 to the rotor 14. The elevating and conveying means 15 operates at a sufficient velocity to adequately move the maximum anticipated crop volume from the auger 13 through the feeder 12. An inlet beater 17 rotates at a higher tangential velocity than the feeder 12 to accelerate the crop materials in a rotor inlet transition area 18. The feeder 12 is removably mounted on the combine 10 near the axis of the beater 17 by a hinge-like connection which provides the header 11 with a floating action to conform to variations in the soil surface 21.

Generally disposed above the feeder 12 is a windowed operator's cab 23 containing various operating controls (not shown) for observing and controlling the crop harvesting operation of the combine 10.

The rotor 14 is longitudinally and approximately horizontally disposed in the combine 10 and is of sufficient axial dimension to extend from the inlet transition area 18 to a discharge area 24 at the rear of the combine 10. In the inlet transition area 18 the flow of crop materials changes from an axial or straight ribbon-like flow through the feeder 12 to an arcuate ribbon-like flow between the flighting 25 disposed about the reduced diameter core tube portion 20 of the rotor 14 near the inlet end 26, to a helical sleeve-like flow between the rotor 14 and the rotor casing 33 in the threshing area 27 and the separating area 34. The flighting 25 is tapered about the inlet end 26 to define a frusto-conical surface of revolution for closer placement of the inlet beater 17 to the rotor 14 without interference therebetween.

The crop materials are delivered by the flighting 25 to a threshing area 27 of the rotor 14 whereat a plurality of threshing elements 28 cause the crop materials to undergo shear and impact forces between the threshing elements 28 and the concave 30 disposed in the lower portion of the rotor casing 33. Guide vanes 32 which are helically disposed in relation to the axis of the rotor 14 about the interior top surface of the rotor casing 33 cause progressive rearward movement of the crop materials axially along the rotor 14 in a modified helical motion about the rotor 14.

Upon movement of the crop materials into a separation area 34, the crop materials continue to be subjected to a threshing action, but by different rasp bars or separating elements 35 longitudinally disposed along the surface of the rotor 14, in conjunction with a similar construction of the rotor casing 33, including the concave 30 and the guide vanes 32, for further removal of grain or the like from the crop materials.

A detailed description of the grain cleaning apparatus 31, including a grain pan 37, a separator pan 38, a chaffer 39 and a sieve pan 40, is presented hereinafter.

A blower 41 provides a source of high volume air flow to aid in the chaffing and sieving operations such that clean grain is delivered to a grain auger 42 by an inclined grain deflector pan 43 disposed below a portion of the sieve pan 40. Mixed grain and other crop component materials, also referred to as tailings, are delivered by another inclined pan 45, generally disposed below portions of the chaffer 39 and sieve 40 to an auger 46, for return to the inlet transition area 18 by means of an elevator 47 for rethreshing by the rotor 14. The grain auger 42 delivers clean grain to an elevator auger 49, the upper end of which discharges into a grain tank 48 of the saddle type which extends over and down opposite sides of the rotor casing 33.

An internal combustion engine 50 disposed near the rear of the combine above the rotor casing 33 provides the motive power for the various moving elements for the combine 10, including a pair of driven front wheels 51.

The cleaning area 31 houses the stepped or cascaded grain pan 37, the separator pan 38, the chaffer 39 and the sieve 40. The grain pan 37 is disposed immediately below the threshing concave 27 of the rotor casing 33 to receive grain from the threshing section, and is downwardly inclined toward the rear of the combine to discharge the grain, corn, soy beans or other crop materials onto a chaffer 39. The grain pan 37 is stepped at its lower end as indicated at 36 and this imparts a cascading action to the grain which tends to break up clumps of grain as it discharges onto the chaffer 39. The lip of the lower step 36 is preferably provided with a comb-like row of fingers 67 which promote separation of grain kernals. The oscillating grain pan 37 is slidably disposed between upstanding frame members 58 (FIG. 2) which provide support for the saddle-type grain tank 48. It will be seen that the upper end of the grain pan 37 extends over the cross auger 61 interconnecting the boots of the grain tank 48. The grain pan 37, separator pan 38, chaffer 39 and sieve 40 are arranged to be oscillated by known mechanism so as to have the conventional shaking action.

An oscillating separator pan is disposed immediately below the separator portion 34 of the rotor casing 33 in a manner similar to the grain pan 37, but with the separator pan 38 sloping downwardly toward the front of the combine, also to discharge grain materials not falling therethrough onto the chaffer 39. In some embodiments, the separating pan 38 may be eliminated such that mixed materials from the separating area 34 fall directly to the chaffer 39.

The lower end of the chaffer 39 is disposed immediately below lower ends of the grain pan 37 and separator pan 38 and immediately above the discharge end of the housing 44 of blower 41 so as to receive air flow therefrom for removal of chaff from the grain.

Despite the compact height arrangement of the cleaning components 37, 38, 39 and 40, sufficient spacing is provided for large volumes of air flow from the blower 41 through the cleaning area 31, without appreciable restriction, to exhaust along with the chaff below the deflector plate 55 at the rear of the combine. The cascading relationship of the components 37, 38, 39 and 40 also serves to break up grain materials falling therebetween such that the grain is in a dispersed condition for improved cleaning action.

The auger 61 extends transversely through the boots 63, 64 of the saddle grain tank 48 and through the housing 71 interconnecting the boots. The cross auger 61 is provided with flighting 66, which moves the grain in the boots of the grain tank 48 to the lower end of an upright unloading auger 69. An elbow 70 is swingably mounted on the upper end of the auger 69 so that on being swung to the side grain can be discharged into a grain truck or wagon. Rotary drive means 68 is secured to one end of the auger 61 exterior to the grain bin 48 for rotative movement to the auger 61.

With the foregoing structural arrangement of the components of cleaning area 31, the saddle grain tank 48, and the cross auger 61, the rotor 14 and the coaxial rotor casing 33 may be disposed longitudinally through the combine 10 in a generally horizontal orientation for low discharge of threshed materials from a discharge end 53 of the rotor 14. The saddle grain tank 48 may therefore be of high volumetric capacity due to the low rotor casing orientation. Furthermore, the top height of the grain tank 48 and the combine 10 may be substantially reduced to provide a lower center of gravity for greater stability of the combine 10 and to facilitate shipment thereof.

It will be understood that various changes and modifications may be made without departing from the spirit of the invention as defined in the following claims.

We claim:

1. In an axial combine having a generally horizontal fore and aft extending rotor-rotor casing combination, a saddle grain tank extending over and down opposite sides of said rotor-rotor casing combination with a horizontal discharge auger extending through the boots of said grain tank and through an auger housing interconnecting the same, and cleaning apparatus nested beneath the threshing and separating portions of said rotor-rotor casing combination, the improvement which comprises the grain pan of the cleaning apparatus having its upper end extending over said auger housing of said grain tank and in between the sides of said tank and having a stepped lower end discharging onto the lower end of a chaffer.

* * * * *